Figure 1:
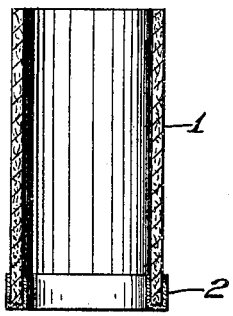

Nov. 29, 1938.   A. HINZE   2,138,699
CONTAINER
Filed Oct. 1, 1936

Albert Hinze   INVENTOR
BY
Frank C. Hilberg
ATTORNEY

Patented Nov. 29, 1938

2,138,699

UNITED STATES PATENT OFFICE 2,138,699

CONTAINER

Albert Hinze, Ardmore, Pa., assignor to E. I. du Pont de Nemours & Company, Wilmington, Del., a corporation of Delaware Application October 1, 1936, Serial No. 103,525

5 Claims. (Cl. 93—39.1)

This invention relates to a laminated structure container and more particularly to an improved process for manufacturing such a container.

Laminated structure containers adapted for use as carriers for aqueous and oily liquids, grease, etc., have been manufactured and used but possess certain disadvantages which have prevented a more widespread and extended use. One of the chief disadvantages has been a tendency to leakage around the edges at the top and bottom where the side wall is joined to the end closures which are usually metal caps. These metal caps are usually crimped to the upper and lower edge of the side wall of the container and often an adhesive is used between the edge of the side wall and the crimped portion of the end or cap. Adhesives which have been used include the well known glues of animal or vegetable origin and rubber cements. The glues are not entirely satisfactory because of their hygroscopic nature. When a container comes in contact with water or moisture the strength of the bond between the end cap and the side wall is greatly reduced making the container in many instances unsatisfactory for further use. The rubber cements are affected by contact with oil and further are subject to deterioration by oxidation with a resultant impairment and failure of the bond between the cap and the side wall. The failure of these adhesives allows the top and bottom edges of the side wall to absorb the liquids in the container and so further decreases the utility of the container. It is highly desirable in order to produce a satisfactory container of the type described to overcome these defects inherent in materials as made at present.

This invention therefore has as an object the provision of a method for adhering surfaces utilizing a heat energizable adhesive whereby greater uniformity with a resultant impervious joint is obtained.

A further object is the provision of a method for adhering laminated surfaces utilizing the heat energizable adhesive whereby the resulting joint is rendered substantially impenetrable to oil and water.

Another object is the provision of a method for adhering surfaces by means of a heat energizable adhesive which is sufficiently elastic so that differences in the coefficient of linear expansion of two dissimilar materials which are joined by a film of adhesive do not destroy the bond between the materials being adhered to one another.

A still further object is the provision of a method for adhering surfaces by means of a heat energizable adhesive, which protects the end grain of the fiber of a laminated fibrous structure, thus preventing the penetration of aqueous or oily materials at the contact surfaces of the side wall of the container and the metal caps or ends.

These and other objects which will be apparent hereinafter are accomplished by the use of a heat energizable adhesive composition to produce an impervious joint between the side wall and the metal ends or caps of the container. The adhesive further seals the edges of the side wall of the container thus preventing the absorption of the contents of the container by these edges where they are in contact with the material in the container.

Figure 2:
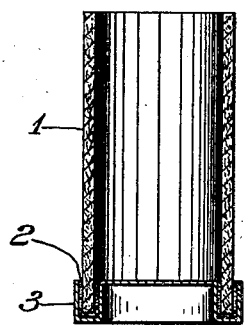
Figure 4:
Figure 3:
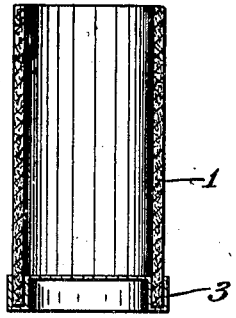

In the drawing, Figure 1 is a section through a portion of container material having adhesive applied to one end. Figure 2 represents a section of the same material having the cap placed over one end. Figure 4 is a section through a cap and Figure 3 is a section through a container having the cap crimped in place.

In every figure, 1 represents the wall of the paper or laminated container, 2 is the heat energizable adhesive, and 3 is the metal cap.

In the practice of the present invention, a film of a suitable adhesive composition is applied to the ends of a laminated paper structure adapted for containing liquids and the like, and allowed to dry. A metal cap is fitted to the ends of the container and the edges crimped using a heated crimping tool. An example of a sutable adhesive composition is:

*Example I*

| | Percent |
|---|---|
| Cellulose nitrate (low viscosity) | 8.0 |
| Denatured alcohol | 10.0 |
| Toluol | 29.0 |
| Dibutyl phthalate | 6.0 |
| Ethyl acetate | 33.0 |
| Synthetic resin | 14.0 |
| | 100.0 |

The viscosity characteristic of the cellulose nitrate used in this composition is approximately 3 seconds as determined in accordance with A. S. T. M. specifications D-301-33, Formula B.

The synthetic resin used in the above formula is a reaction product of:

| | Percent |
|---|---|
| Phthalic anhydride | 45.8 |
| Glycerol | 28.8 |
| Castor oil | 25.4 |
| | 100.0 |

The resin is prepared by charging the ingredients into an aluminum kettle fitted with a mechanical stirring device and a thermometer. The mass is heated to 225 deg. C. in approximately 30 minutes time and held at this temperature until an acid number of 13-15 is obtained, the stirring being maintained throughout the heating cycle which is approximately 4½ hours.

In the crimping operation the surface of the fibrous side wall of the container is sometimes bruised causing subsequent leakage at the bruised point. Where a heat energizable adhesive is used such bruised portions are coated or covered with the adhesive which is in a molten condition, since the crimping is carried out with the aid of heat. A conventional type of container for oil and similar materials which is adapted to the practice of the present invention may be one which consists of a laminated cylindrical paper structure comprising an intermediate rigid fibrous lamination of material such as cardboard, an inner oil resistant layer secured thereto, such as regenerated cellulose sheeting, metal foil, or parchment paper, and an outer water-repellent layer adhering to the intermediate lamination. The container may also be of the molded, spirally wound, or of a convolute type of structure.

If desired the adhesive may be applied to the metal end or cap itself rather than to the fibrous or other structure side wall. The application of the adhesive to the edges of the metal ends or caps is not as practical from a mechanical standpoint so that it is usually preferred to apply the adhesive to the edges of the side wall of the container. However, it is to be understood that either procedure comes within the scope of the present invention.

I am aware of the patent to John, No. 1,920,081, which relates to practically the same subject matter as the present case except that instead of using a grease-proof glue I have found that a heat energizable adhesive such as the example given above or those which follow give unexpectedly superior results. The glues used by John are designated as thermoplastic and the patentee cites as an example "airplane dope". This material is not heat energizable in the sense used in the present case. By the term heat energizable I intend to cover adhesives which are only slightly or non-tacky at ordinary temperatures up to about 50° C. at which temperature the adhesive becomes slightly tacky. At temperatures between 120 and 150° C. the adhesives herein disclosed become soft and highly adhesive and are easily formed or shaped by the hot crimping iron used to crimp the metal tops of the container onto the side walls.

The adhesives heretofore used do not have this property. For example, "airplane dope" is applied to the fabric of airplanes to shrink the fabric so that it will always be in a taut condition and will not soften under very hot sun. The above adhesive would not be suitable as an "airplane dope".

The adhesives herein disclosed flow very rapidly under the influence of the temperatures indicated above, thereby filling in porous or uneven surfaces. On cooling, the adhesive sets up quickly and develops a strong bond between the surfaces cemented together. Due to the property known as cold-flow, which the adhesives herein disclosed have, surfaces having dissimilar coefficients of linear expansion are joined together very successfully and consequently also a tight seal is maintained at all temperatures and humidities normally encountered in shipping and storing the container. A good seal is also maintained during very rapid changes in temperature. Above 120° C. the adhesive is soft and very sticky.

Other resins embodying the advantageous characteristics of high compatibility with cellulose nitrate, high coefficient of plasticity, high degree of heat energizability and strength of bond, as aryl sulfonamid-formaldehyde resins, xylene sulfonamide-formaldehyde resins, vinyl acetate resins, vinyl acetate-vinyl chloride resins, urea-formaldehyde resins, and phenol-formaldehyde resins may be used in place of the resin noted in the above composition.

Cellulose acetate may be used as the cellulose derivative ingredient of the heat energizable adhesive composition provided a sufficient percentage of heat energizable resin or sufficient plasticizer is added. A satisfactory composition containing cellulose acetate is as follows:

*Example II*

| | Percent |
|---|---|
| Cellulose acetate (low viscosity) | 9.0 |
| Resin (reaction product of aromatic sulfonamides and formaldehyde) | 14.0 |
| Plasticizer (o- and p-toluene ethyl sulfonamides) | 7.0 |
| Diacetone alcohol | 8.0 |
| Acetone | 41.0 |
| Toluene | 21.0 |
| | 100.0 |

It has also been found that polymeric methyl methacrylate as well as certain of the higher esters such as n-propyl, n-butyl, or isobutyl metacrylates are particularly satisfactory.

The following example illustrates this phase of the invention in which methyl methacrylate is used although it will be understood that this can be replaced by the other esters:

*Example III*

| | Percent |
|---|---|
| Methyl methacrylate | 85.0 |
| Dibutyl phthalate | 15.0 |

The above composition may be dispersed in solvents such as ketones, aromatic hydrocarbons, or chlorinated hydrocarbons for convenience in applying the adhesive to the container. The percentage of dibutyl phthalate or other plasticizer may be varied within certain limits to suit the purpose desired and the character of the container material, etc.

The following example illustrates another composition which does not include a cellulose derivative:

| | Percent |
|---|---|
| Synthetic resin | 46.2 |
| Dibutyl phthalate | 13.8 |
| Toluene | 40.0 |
| | 100.0 |

The resin used in this example is a vinyl acetate polymer such as that sold under the trade name of Vinyloid A-15 by the Carbide and Carbon Corp. This resin may be substituted at least in part by resins prepared by the interpolymerization of a mixture of vinyl chloride and vinyl acetate.

The structure of the side wall of the container previously noted is also suitable for containers of other types in that it will withstand strains or excessive stresses during shipment. It is to be understood that the process is not restricted to this particular type of container construction since satisfactory results are secured with any similar structures where it is desired to seal effectively the contents of the container and prevent seepage into and through walls of the container at the top and bottom closures.

The process of the invention is particularly adaptable to the joining of surfaces as the metal ends or caps to the side wall, of fibrous structure containers used for storage and transportation of oils, greases and similar materials. It is further adaptable for use in the construction of containers whose side walls may be such material as regenerated cellulose sheeting, fabric as such or reinforced, cellulose derivative plastic sheet material, etc.

The practice of the invention in the manufacture of containers produces a joint between the end walls or caps and the side wall of high mechanical strength, insuring substantially no leakage of the contents of the container when the latter is subjected to unusual stresses or strains. Further the edges of the wall structure of the container are sealed thus preventing the absorption of the contents of the container by laminated material whose edge might be absorbent or the absorption of moisture from the exterior.

It is apparent that many widely different embodiments of this invention may be made without departing from the spirit and scope thereof; and, therefore, it is not intended to be limited except as indicated in the appended claims.

I claim:

1. The process of applying end closures to paper containers which comprises applying to the ends of the container an oil-proof and water-proof heat energizable adhesive which becomes tacky as its temperature is increased to about 50° C., allowing the adhesive to dry, fitting the end closure in place, and crimping the edges at a temperature at which the adhesive is fluid, said adhesive containing material selected from the class consisting of plasticized cellulose derivatives and synthetic thermoplastic resins.

2. Process of claim 1 in which the heat energizable adhesive contains cellulose nitrate.

3. Process of claim 1 in which the heat energizable adhesive contains a vinyl resin.

4. Process of claim 1 in which the heat energizable adhesive contains polymeric methyl methacrylate.

5. Process of preparing paper containers which comprises preparing the side wall of the said container by laminating a plurality of cellulosic layers joined togethehr by means of a cellulose derivative cement cutting the said container into the desired length and applying to the edges an oil-proof and water-proof heat energizable adhesive which cold flows at ordinary temperature and which becomes tacky as the temperature increases above 50° C., and which flows freely at temperatures above 120° C. when dry, and thereafter applying a metallic end closure and crimping the same to the side walls at a temperature at which the adhesive is fluid.

ALBERT HINZE.